(12) United States Patent
Leung et al.

(10) Patent No.: US 11,497,350 B2
(45) Date of Patent: Nov. 15, 2022

(54) TOASTER AND CONTROL SYSTEM FOR A TOASTER

(71) Applicant: CONAIR CORPORATION, Stamford, CT (US)

(72) Inventors: Anthony Kit Lun Leung, North Point (HK); Kin Man Lai, New Territories (HK); Lai Man Tse, Aberdeen (HK)

(73) Assignee: Conair LLC, Stamford, CT (US)

( * ) Notice: Subject to any disclaimer, the term of this patent is extended or adjusted under 35 U.S.C. 154(b) by 39 days.

(21) Appl. No.: 16/993,740

(22) Filed: Aug. 14, 2020

(65) Prior Publication Data

US 2022/0047116 A1   Feb. 17, 2022

(51) Int. Cl.
*A47J 37/08*   (2006.01)

(52) U.S. Cl.
CPC ....... *A47J 37/0857* (2013.01); *A47J 37/0814* (2013.01)

(58) Field of Classification Search
CPC .... A47J 37/0611; A47J 37/0718; A47J 37/08; A47J 37/0807; A47J 37/0814; A47J 37/0821; A47J 37/0835; A47J 37/0842; A47J 37/085; A47J 37/0857; A47J 37/0871; A47J 37/0878
USPC .................. 99/385–387, 389–393, 401, 402
See application file for complete search history.

(56) References Cited

U.S. PATENT DOCUMENTS

| | | | |
|---|---|---|---|
| 2,036,826 A | 4/1936 | Peters | |
| 2,112,076 A | 3/1938 | De Matteis | |
| 5,938,959 A | 8/1999 | Wang | |
| 6,481,341 B1 | 11/2002 | Choi | |
| 6,639,187 B2 | 10/2003 | Arel et al. | |
| 6,829,983 B2 * | 12/2004 | Arnedo | A47J 37/0814 99/385 |
| 6,868,775 B2 | 3/2005 | Chen | |
| 8,631,737 B2 * | 1/2014 | Zhang | A47J 37/08 99/385 |
| 2003/0066434 A1 | 4/2003 | Tomsich et al. | |
| 2004/0211324 A1 | 10/2004 | Wanat | |
| 2008/0202347 A1 | 8/2008 | Chen et al. | |
| 2013/0177687 A1 | 7/2013 | Cheung | |
| 2014/0352549 A1 | 12/2014 | Upston et al. | |
| 2017/0238763 A1 | 8/2017 | Mao | |

OTHER PUBLICATIONS

Corresponding PCT Application No. PCT/US2021/041819 International Search Report and Written Opinion dated Oct. 26, 2021.

* cited by examiner

*Primary Examiner* — Hung D Nguyen
(74) *Attorney, Agent, or Firm* — Grogan, Tuccillo & Vanderleeden, LLP

(57) ABSTRACT

A toaster includes a housing having a slot for receiving a food item, a heating element associated with the slot for toasting the food item, a carriage assembly having a supporting rack movably mounted in the slot for supporting the food item within the slot, a first slider member connected to the supporting rack, and a second slider member operatively connected to the first slider member, a motor, and a driving member having a first end operatively connected to the motor and a second end received in a slot in the second slider member such that when the motor is driven to rotate the driving member, the driving member drives the supporting rack, via the first slider member and the second slider member, to slidably move within the slot.

11 Claims, 21 Drawing Sheets

TOASTER AND CONTROL SYSTEM FOR A TOASTER

FIELD OF THE INVENTION

The present invention relates generally to kitchen appliances and, more particularly, to a motorized toaster and a control system a motorized toaster.

BACKGROUND OF THE INVENTION

Vertical toasters for browning and crisping a slice of bread to produce toast have long been developed and widely utilized. Such toasters typically have upwardly facing slots for receiving slices of bread therein, heating elements along the sides of the slots for toasting the slices in the slots, and a rack frame or carriage which is adapted to support the bread slice therein for toasting. The slices are movably supported in the toaster slots in such a manner that they are capable of moving between a lower toasting position and an upper operative position, wherein in the lower toasting position, the carriage is lowered to activate the toaster for toasting the slices in the carriage, and wherein in the upper operative position, the carriage is raised for manual retrieval of the toasted bread slice.

Such conventional toasters further include means for raising the carriage from the lower toasting position to the upper operative position. The raising means usually comprises a resilient element, such as a compressive spring, mounted in the toaster case and arranged to normally apply an upward urging force to the carriage in such a manner that when toasting of the bread slice in the toasting position is finished, the resilient element is arranged to apply an upwards force to the carriage for raising it from the lower toasting position back to the upper operative position.

While existing vertical toasters are suitable for what may be regarded as ordinary performance, there is a need in the art for more precise control over the toasting operation and for improvements in ease of use. For example, existing toasters may be prone to jamming and are ill-equipped to accommodate different size slices of bread, waffles, bagels, and/ or other food items. In addition, there is a need for an improved control system for such a toaster.

SUMMARY OF THE INVENTION

It is an object of the present invention to provide a toaster.

It is another object of the present invention to provide a toaster having a motorized carriage assembly for raising and lowering a food item to be toaster.

It is another object of the present invention to provide a toaster having an improved control system.

These and other objects are achieved by the present invention.

According to an embodiment of the present invention, a toaster includes a housing having a slot for receiving a food item, a heating element associated with the slot for toasting the food item, a carriage assembly having a supporting rack movably mounted in the slot for supporting the food item within the slot, a first slider member connected to the supporting rack, and a second slider member operatively connected to the first slider member, a motor, and a driving member having a first end operatively connected to the motor and a second end received in a slot in the second slider member such that when the motor is driven to rotate the driving member, the driving member drives the supporting rack, via the first slider member and the second slider member, to slidably move within the slot.

According to another embodiment of the invention, a method for toasting a food item includes the steps of providing a toaster having a housing having a slot for receiving a food item, a heating element associated with the slot for toasting the food item, and a carriage assembly having a supporting rack movably mounted in the slot for supporting the food item within the slot, and, with a control unit, and in response to initiation of a toasting operation, moving the supporting rack to a lowered position within the slot by actuating a motor to rotate a driving member, whereby rotation of the driving member drives the supporting rack, via a first slider member and a second slider member, to slidably move within the slot.

According to yet another embodiment of the invention, a toaster includes a housing having a plurality of slots for receiving food items to be toasted, a heating element associated with each slot of the plurality of slots for toasting the food items, a carriage assembly having a plurality of supporting racks, each supporting rack being movably mounted in a respective slot of the plurality of slots, for supporting the food items within the slots, a first slider member connected to the supporting racks, a second slider member operatively connected to the first slider member, and a third slider member operatively connected to the first slider member, a motor, and a driving member having a first end operatively connected to the motor and a second end received in a slot in the second slider member such that when the motor is driven to rotate the driving member, the driving member drives the supporting racks, via the first slider member, the second slider member and the third slider member, to slidably move within the slots.

BRIEF DESCRIPTION OF THE DRAWINGS

The present invention will be better understood from reading the following description of non-limiting embodiments, with reference to the attached drawings, wherein below.

DETAILED DESCRIPTION OF THE PREFERRED EMBODIMENT

Figure 1:
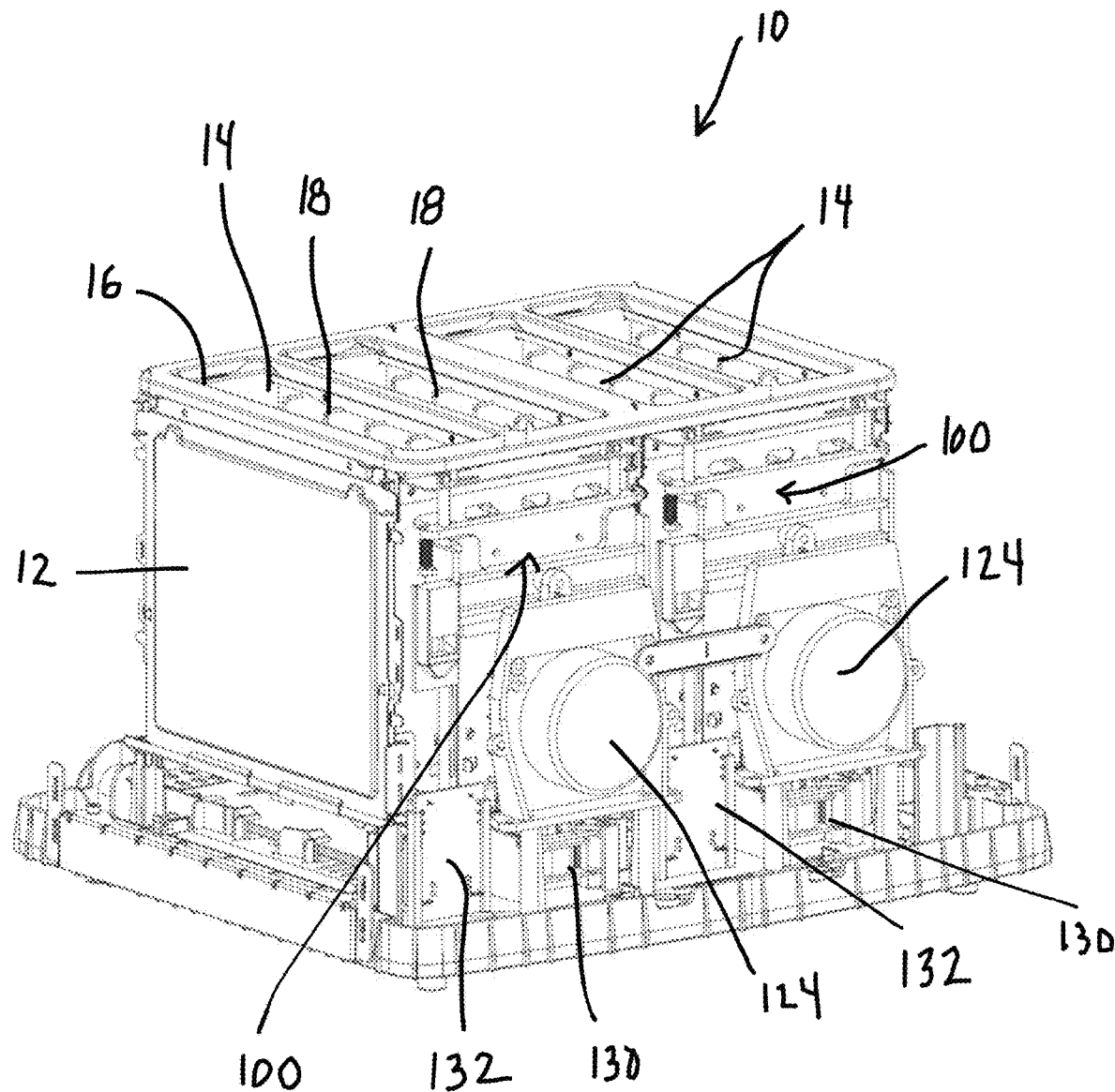
FIG. 1 is a front, perspective view of a toaster according to an embodiment of the present invention.

Referring to FIG. 1, a toaster 10 according to an embodiment of the present invention is illustrated. The toaster 10 includes a housing 12 having at least one vertically oriented slot 14 having an upwardly-facing opening 16 for receiving a food item such as a slice of bread. Each slot 14 includes a heating element 18 positioned on at least one, and preferably both, opposing sides of each slot 14 for browning, heating and/or crisping a food item within the slot 14. The toaster 10 also includes a carriage assembly 100 associated with each slot 14 for supporting the food item within the slot and for selectively raising and lowering the food item within the slot 14 under control of a motor and control unit.

FIGS. 2-5 more clearly illustrate the configuration of the carriage assembly 100. The carriage assembly 100 includes at least one, and preferably two, bread supporting racks 102, 103 mounted in the toaster slots 14 in a vertically movable manner. The supporting racks 102, 103 are configured to support food items such as a slice of bread, and to raise and lower the slices of bread within the slots 14 under control of the control unit, as discussed in detail below. As shown therein, the carriage assembly 100 further includes a first slider member 104, a second slider member 106 and a third slider member 108 operatively connected to one another in the manner hereinafter described. The supporting racks 102, 103 are fixedly connected to the first slider member 104 and moveable therewith. The first slider member 104 is connected to the third slider member 108 via at least one, and preferably two, extension springs 109, 110. The second slider member 106 is positioned generally intermediate the first slider member 104 and the third slider member 108, as described hereinafter.

Figure 5:
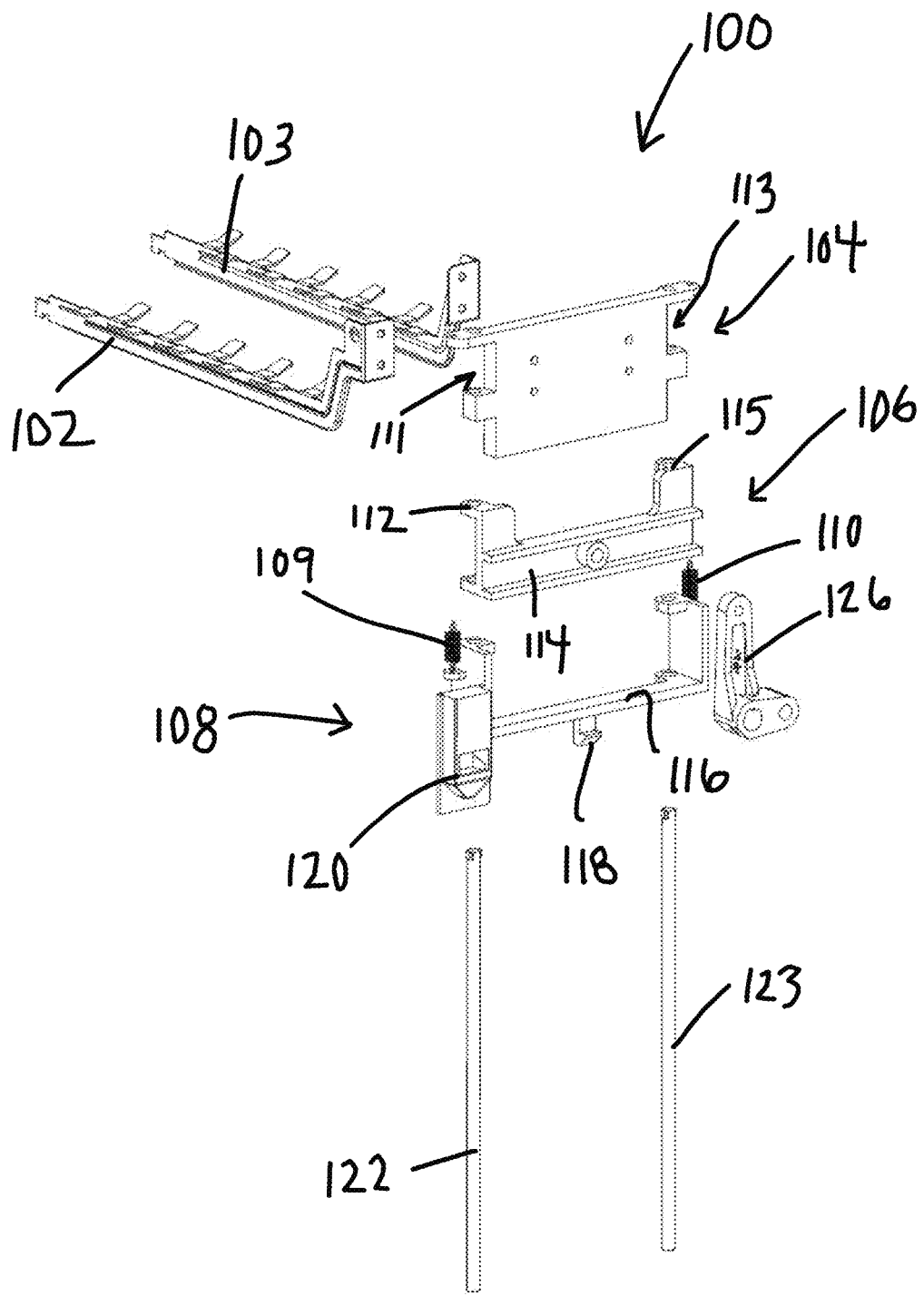
FIG. 5 is an exploded, perspective view of the carriage assembly of FIG. 2.

As best shown in FIG. 5, the first slider member 104 includes a pair of opposed windows or relieved areas 111, 113 within which opposed linkage arms 112, 115 of the second slider member 106 are received, and within which the linkage arms 112, 115 are vertically moveable, as discussed below. The second slider member 106 also includes a horizontally-oriented slot 114 located below the linkage arm 112, the purpose of which will be described below. The third slider member 108, for its part, includes an upwardly-facing contacting surface 116 for contacting engagement with the second slider member 106, a first engagement member in the form of a hook lock 118 located beneath the contacting surface 116 at a general midpoint of the third slider member 108, and a switch actuator in the form of a finger 120 connected to a one end of the third slider member 108.

The first slider member 104, second slider member 106 and third slider member 108 are each slidably connected to at least one, and preferable two, vertically-oriented guide rods 122, 123 which may be considered to form part of the carriage assembly 100 such that each of the first slider member 104, second slider member 106 and third slider member 108 are vertically moveable along the guide rods 122, 123.

Figure 2:
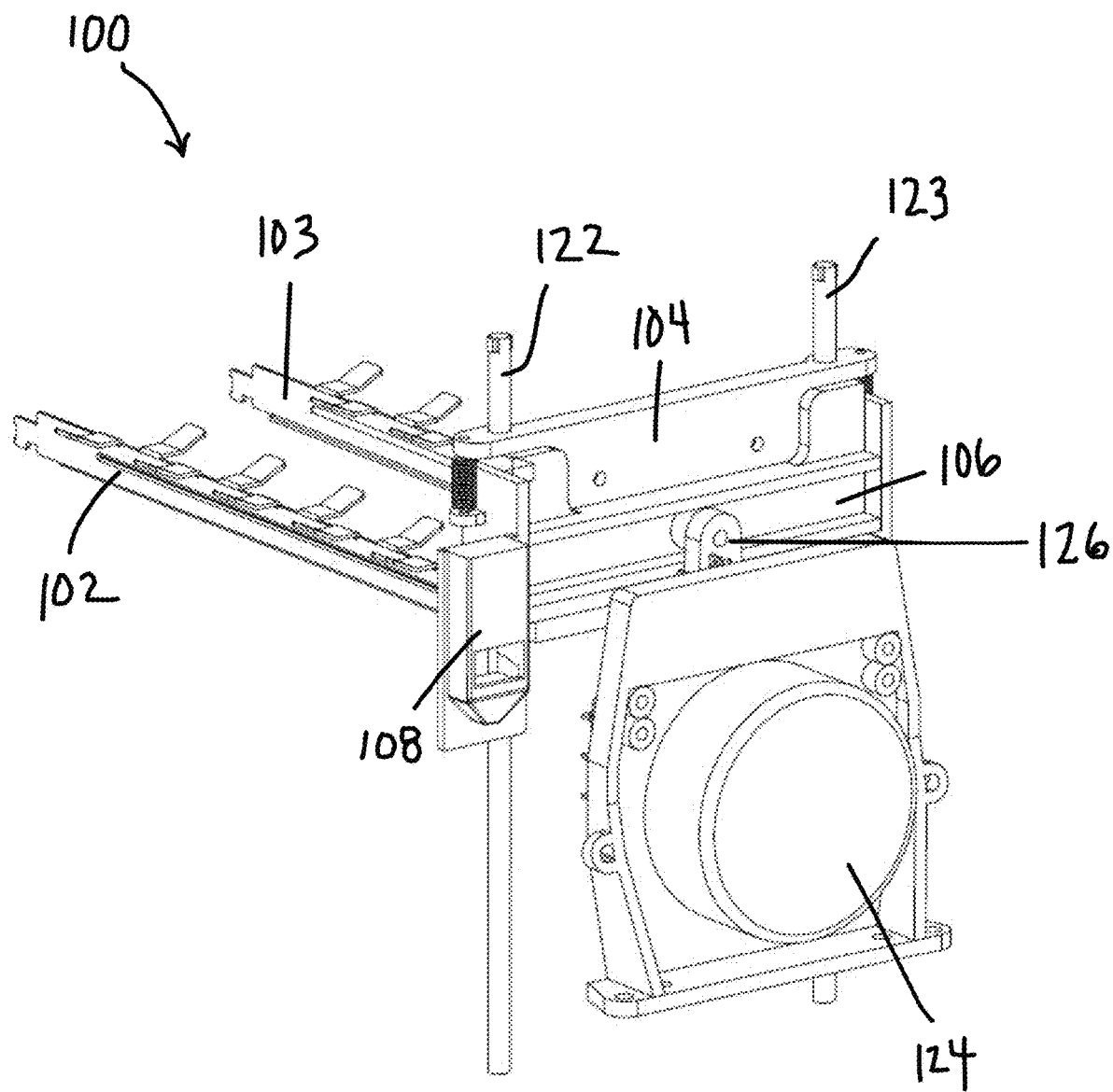
FIG. 2 is front, perspective view of a carriage assembly of the toaster of FIG. 1.

As shown in FIGS. 1 and 2, the toaster 10 includes a driving motor 124 mounted within the housing 12 for producing a rotational force of predetermined magnitude. In an embodiment, the motor 124 may be a servo motor or synchronous motor whose rotational force can be controlled by electrical power inputted through a motor control circuit implemented in the housing 12. In an embodiment, the motor 124 may be an AC motor, a DC motor or a brushless motor, although other types of motors and driving mechanisms may also be utilized without departing from the broader aspects of the invention.

Figure 3:
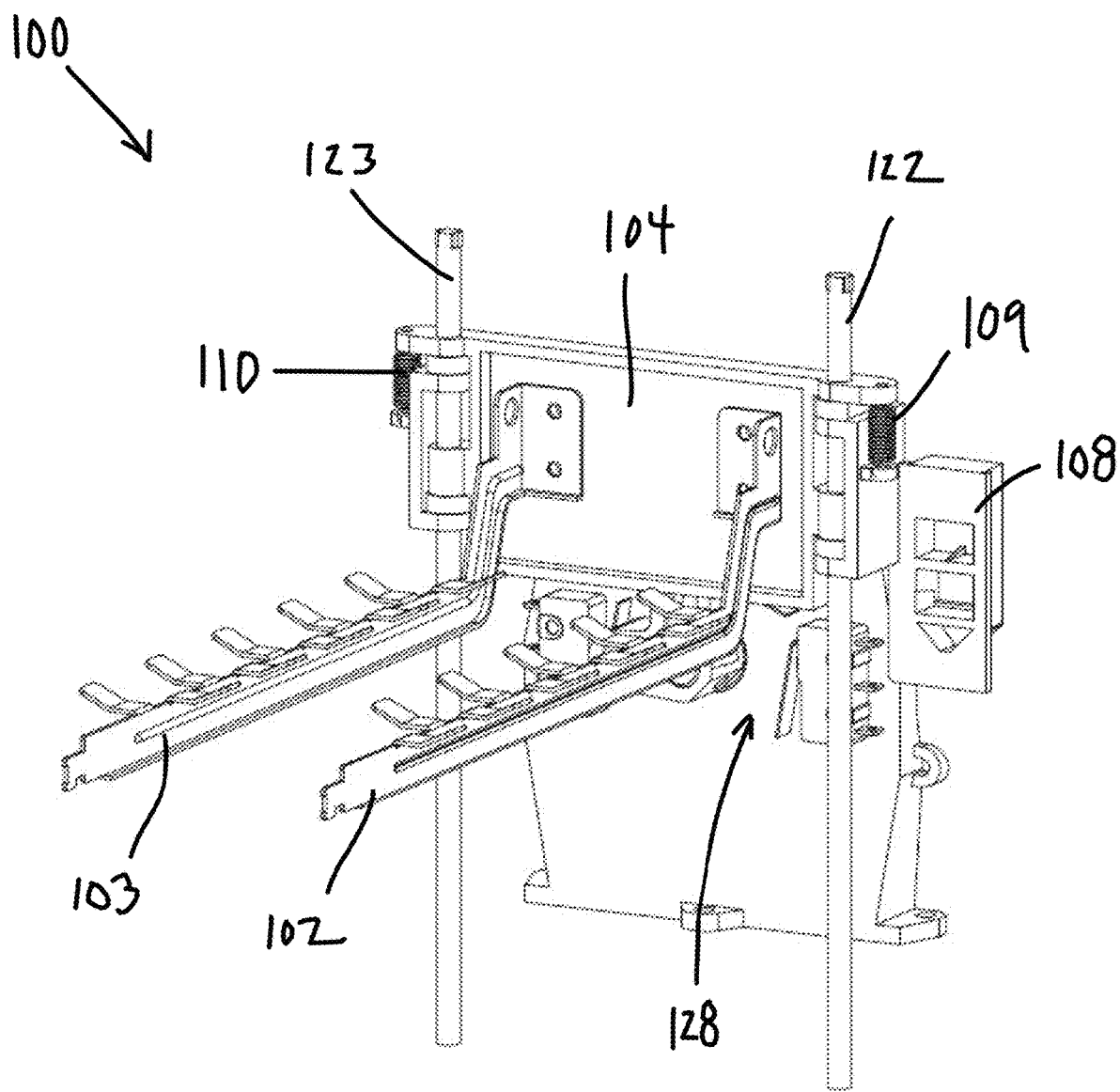
FIG. 3 is a rear, perspective view of the carriage assembly of FIG. 2.
Figure 4:
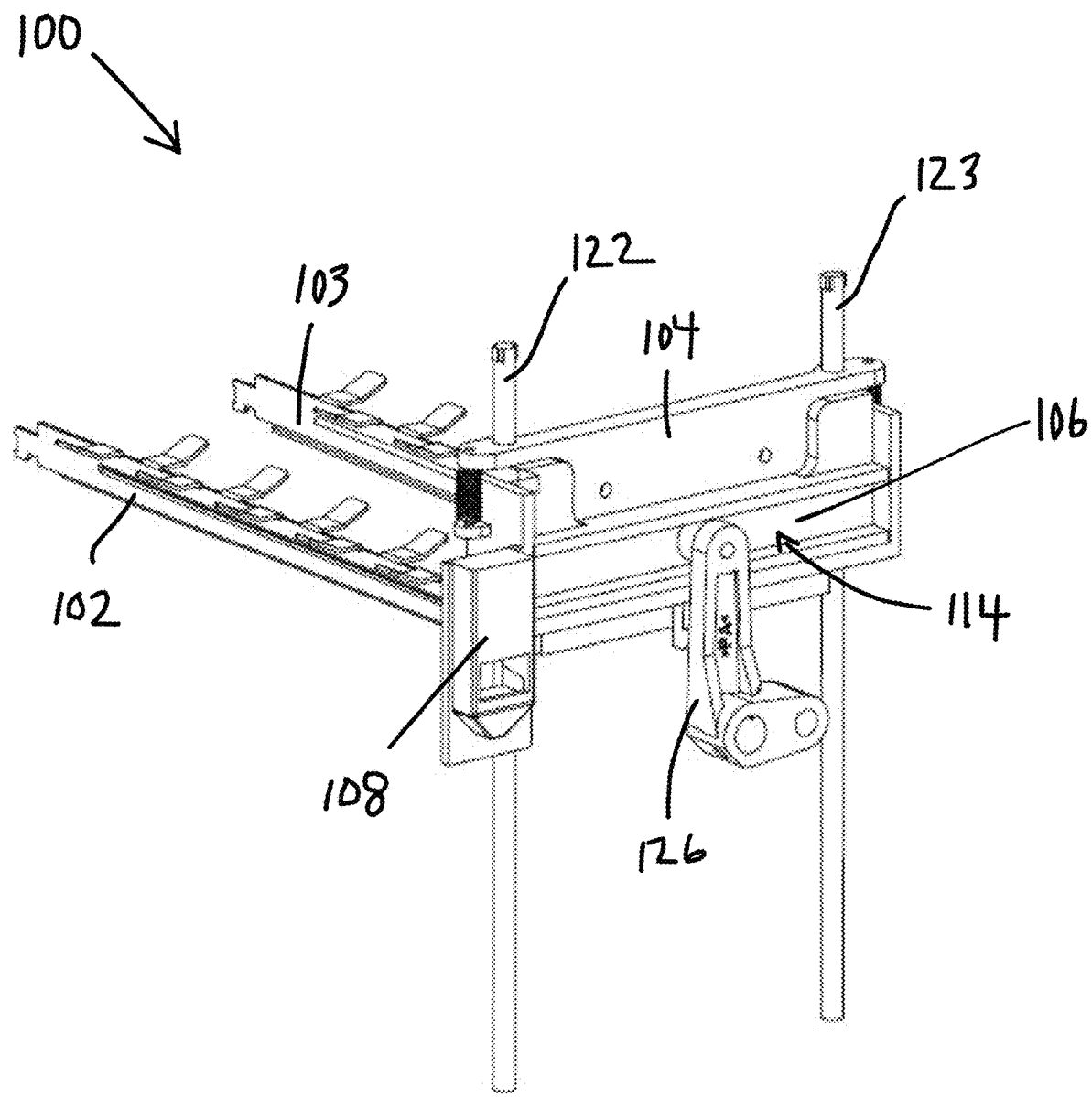
FIG. 4 is a front, perspective view of a portion of the carriage assembly of FIG. 2.

As shown in FIGS. 2 and 3, the toaster 10 further includes a crank or driving member 126 having a first end connected to the motor 124 and a second end received in the slot 114 of the second slider member 106. As disclosed hereinafter, when the driving motor 124 is actuated to rotate the driving member 126, the driving member 126 drives the supporting rack 102 (via the first, second and third sliding members 104, 106, 108) to slidably move along the toaster slot 14 between an upper position and a lower toasting position.

Figure 15:
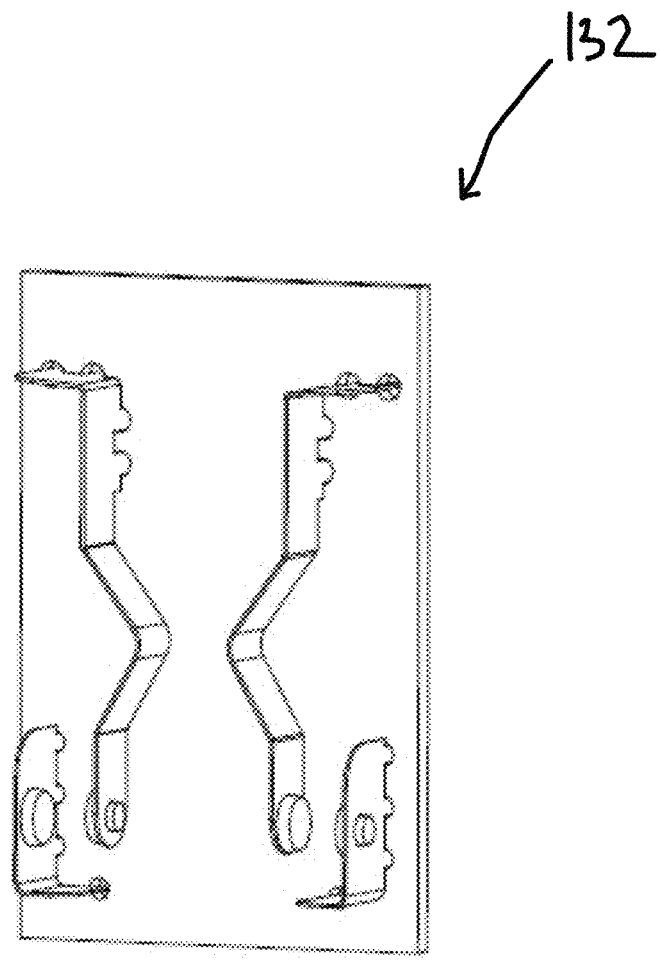
FIG. 15 is a rear, perspective view of a leaf spring power switch of the toaster of FIG. 14.
Figure 16:
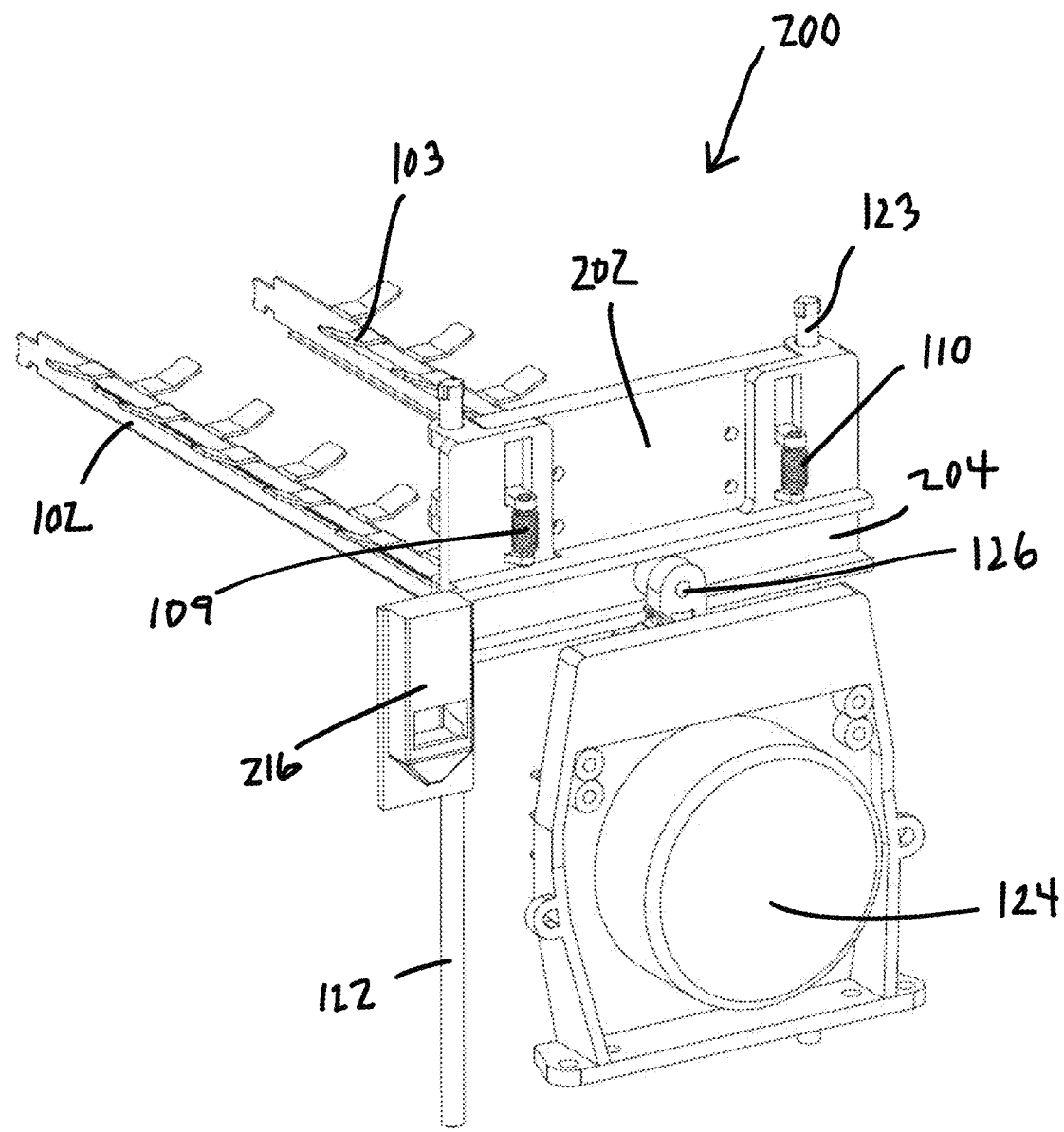
FIG. 16 is front, perspective view of a carriage assembly for a toaster according to another embodiment of the present invention.
Figure 17:
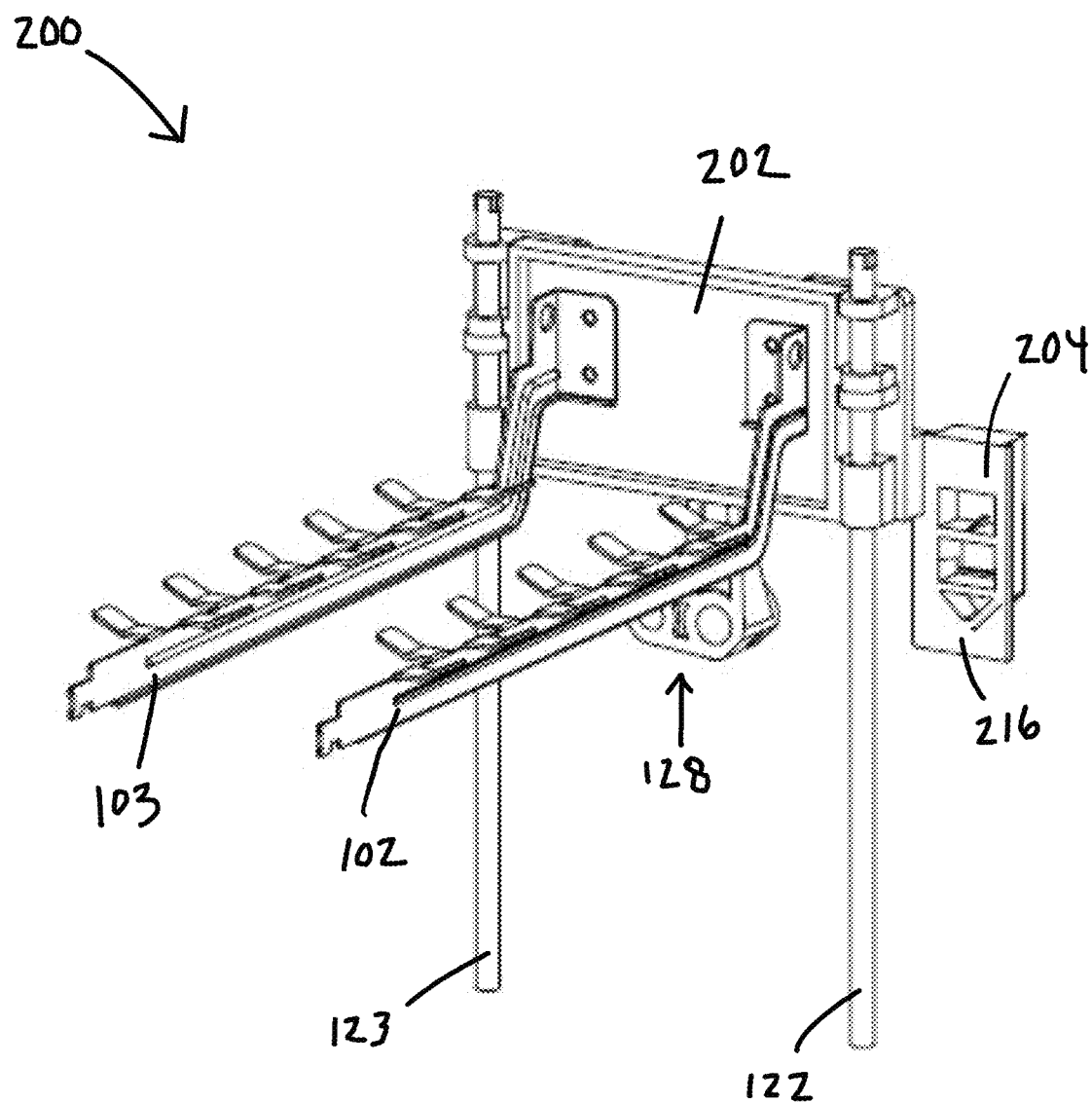
FIG. 17 is a rear, perspective view of the carriage assembly of FIG. 16.
Figure 18:
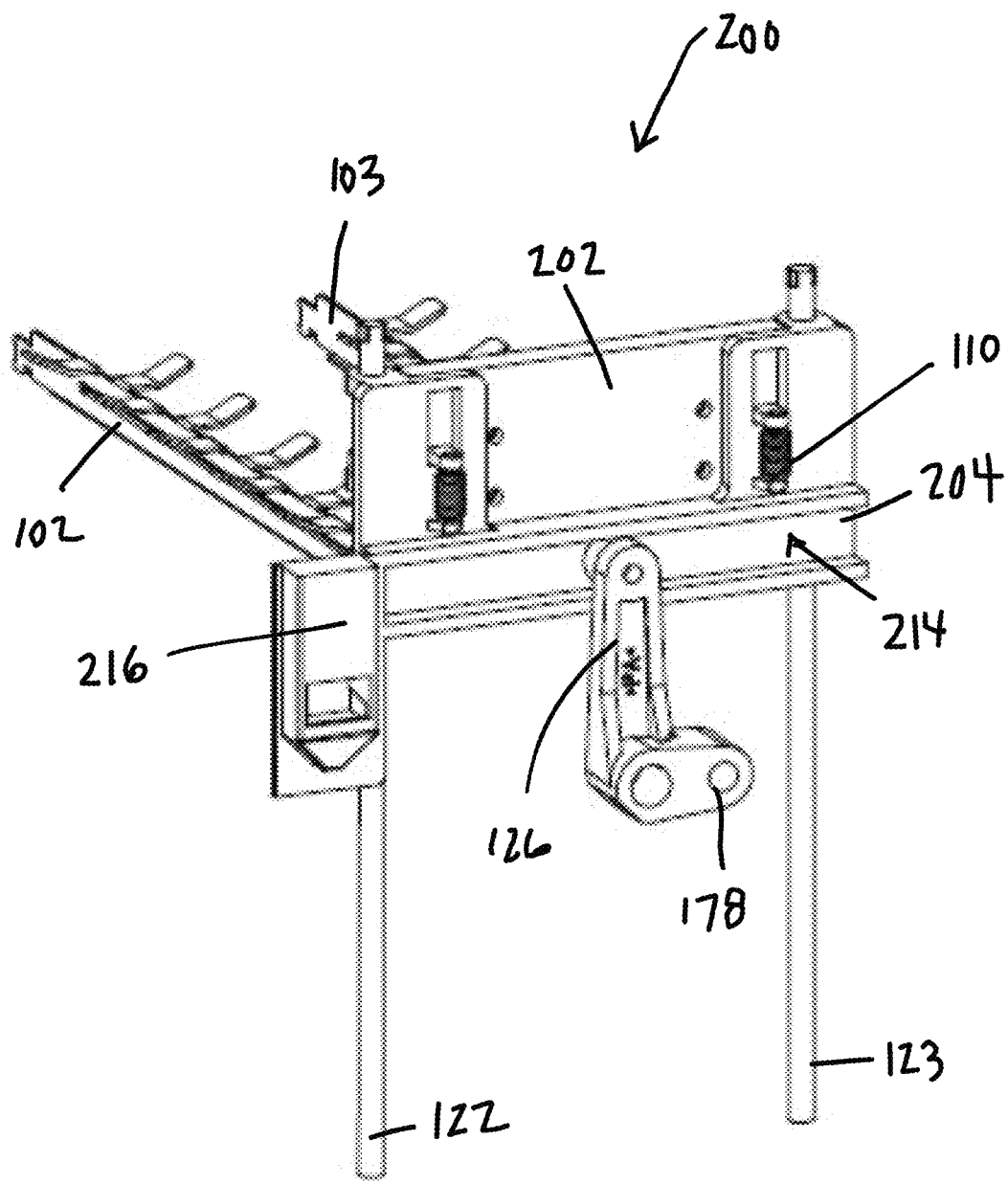
FIG. 18 is a front, perspective view of a portion of the carriage assembly of FIG. 16.

In connection with the above, and as described more fully below, the toaster 10 and/or carriage assembly 100 further includes a positioning system including a position switch 128 operatively connected to the motor 124 for sensing or detecting a position of the crank 126, an electromagnet 130 and a power switch 132 which, in the embodiment of FIGS. 1-5, may be a leaf spring power switch. FIG. 15 shows a more detailed illustration of the leaf spring power switch 132 according to an embodiment of the invention.

Figure 6:
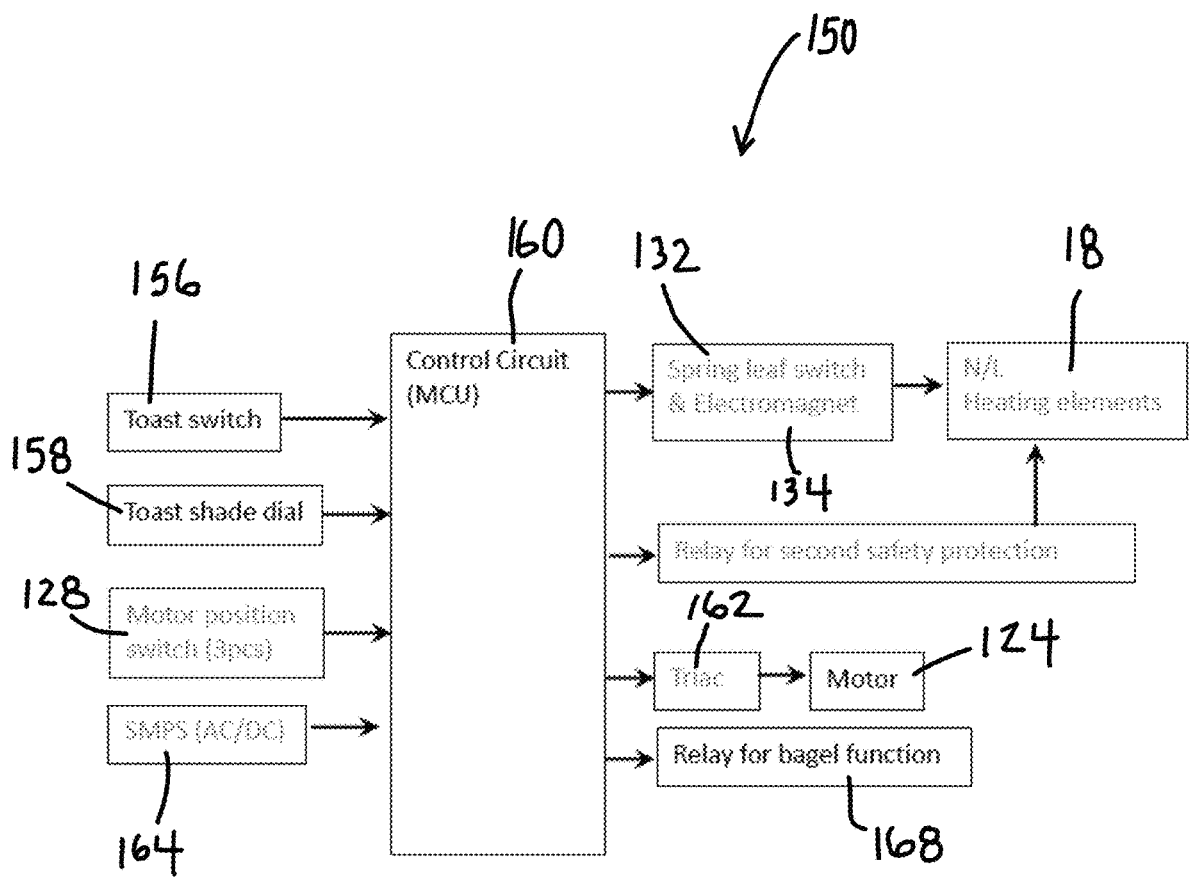
FIG. 6 is a schematic illustration of a control system and control logic of the toaster of FIG. 1.

With reference to FIG. 6, a schematic illustration of a control system 150 for the toaster 10 is illustrated. As illustrated therein, the toaster 10 may include a user interface having a plurality of buttons, switches and/or dials for selecting toast modes, shades, etc. For example, the interface may include a toast switch/button 156 and a toast shade dial 158 in communication with the control unit 160. As also shown therein, the position switch 128 is also electrically connected or otherwise in communication with the control unit 160 for sending signals indicative a position of the motor 124 and/or crank 126 to the control unit 160. In particular, the control system 150 utilizes the position sensor 128 and a triac 162 to control the driving motor 124, as described hereinafter. The control system 150 may also include a switch mode power supply circuit 164 instead of a transformer.

With further reference to FIG. 6, and as indicated above, the control system 150 includes the leaf spring switch 132 and electromagnet 130 which are utilized to control the heating elements 18. This is in contrast to conventional toasters which typically utilize two relays to control the heating elements. The control system 150, however, may also include a relay 166 controllable via the control unit 160 for safety protection to cut off power to all heating elements 18 in the case of failure. In addition, the control system 150 may include a relay 168 for a bagel toasting function, as disclosed hereinafter.

Figure 7:
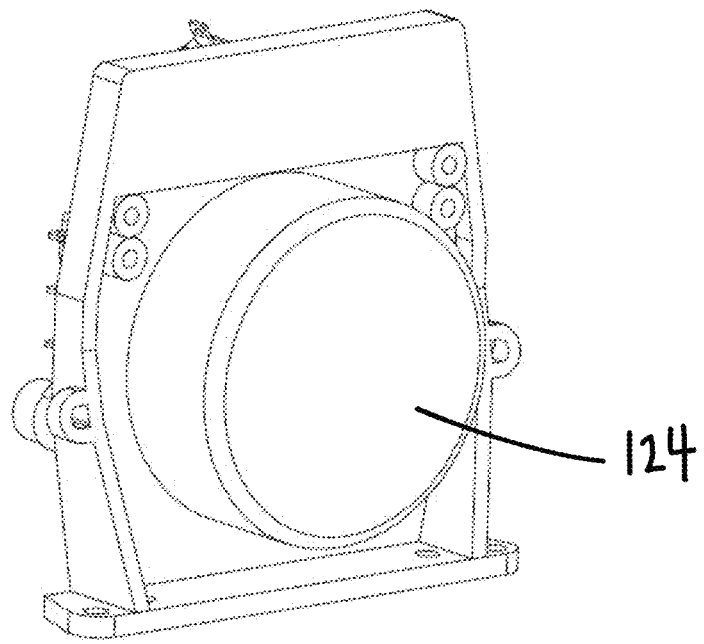
FIG. 7 is a front, perspective view of a portion of a positioning system of the toaster of FIG. 1.
Figure 8:
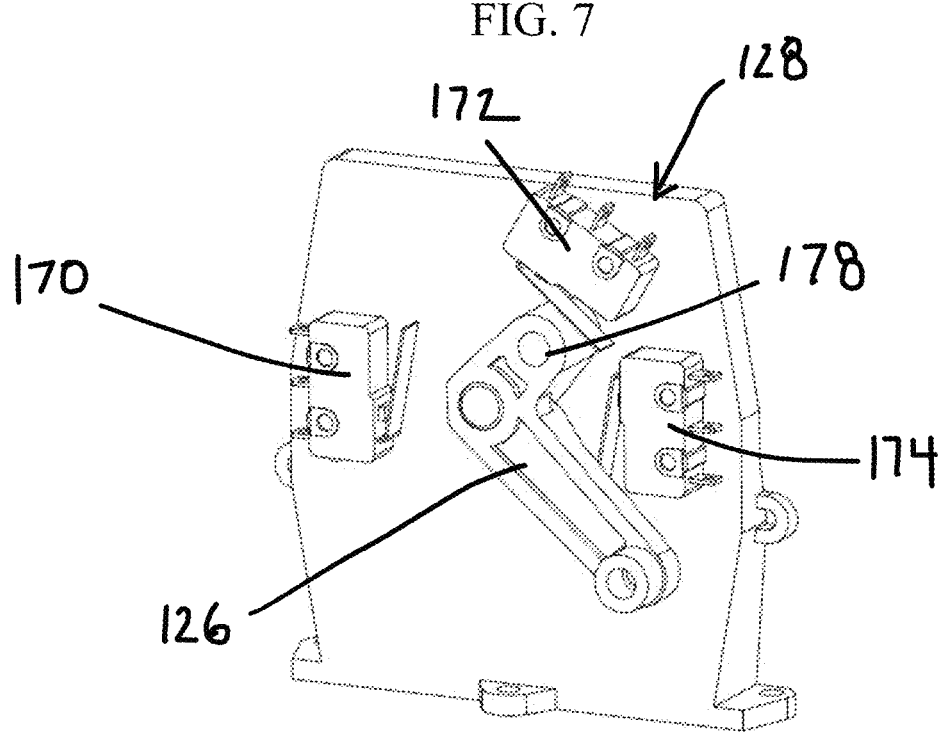
FIG. 8 is a rear perspective view of the positioning system of FIG. 7.
Figure 9:
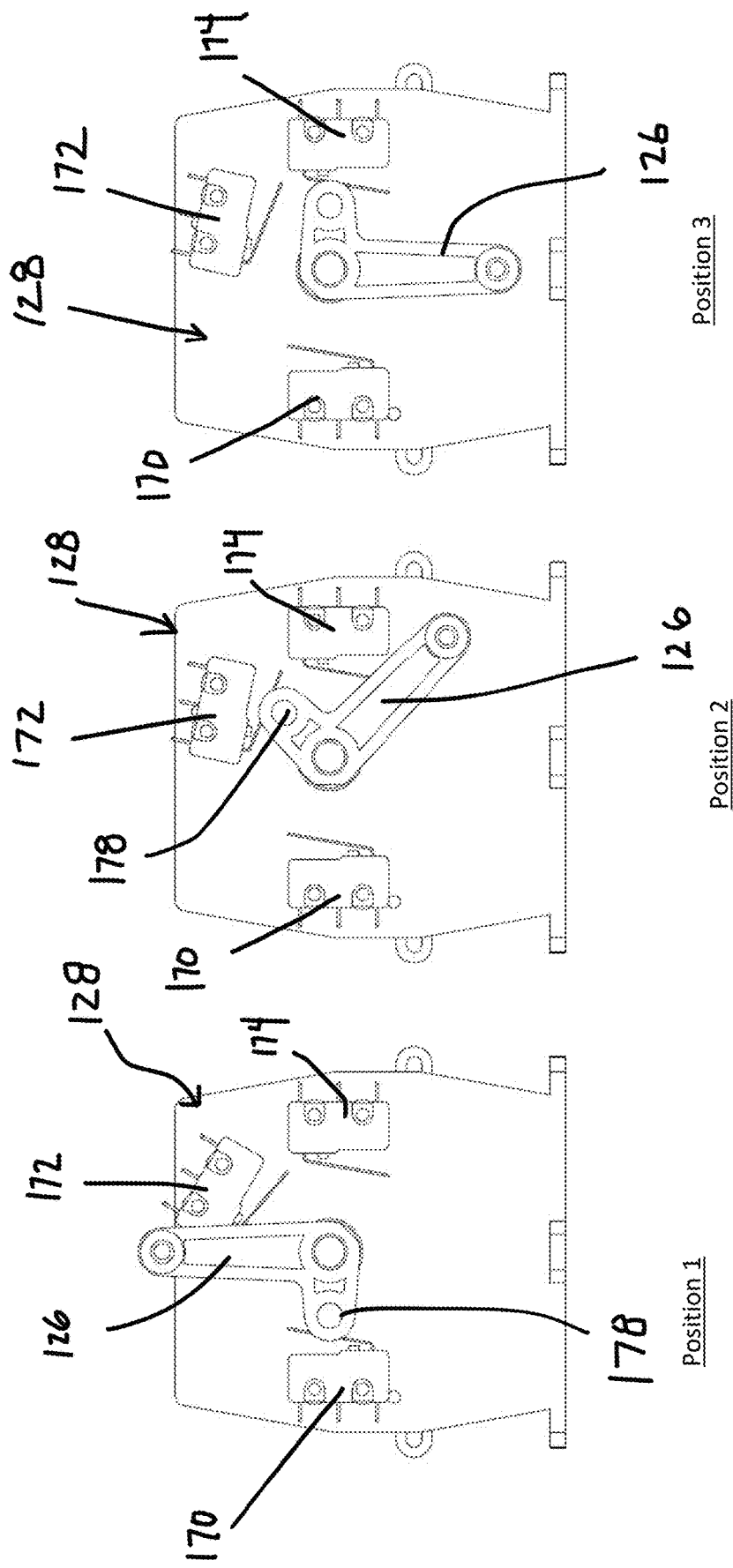
FIG. 9 is a schematic illustration showing operation of the carriage positioning system of FIG. 7.

Referring now to FIGS. 7-9, more detailed views of the motor 124 and position switch/system 128 is illustrated. As shown therein, the position switch/system 128 includes a plurality switch sensors (e.g., sensors 170, 172, 174) and the crank 126 may has projection 178 that is configured to actuate each switch sensor as the crank 126 rotates under control of the motor 124. The control unit 160 is able to determine the position of the slider assemblies and supporting racks based upon which switch sensor has been actuated by the projection 178 of the crank 126. In an embodiment, the switch sensors 170, 172, 174 may be micro switches. In other embodiment, the switch sensors may be leaf spring switches, although other types of switches/sensors may also be utilized without departing from the broader aspects of the invention. In addition, while three switch sensors are illustrated, more or fewer than three switch sensors may also be utilized to provide more (or less) precise control over the positioning of the carriage assembly 100 and supporting racks 102, 103.

FIG. 9 illustrates the position of the crank 126 in various toasting modes. For example, Position 1 shows the position/ orientation of the crank 126 before and after a toasting operation. At Position 1, the projection 178 of the crank 126 actuates the first switch sensor 170, indicating to the control unit that the supporting racks 102, 103 are in a raised position. At Position 2, the crank 126 has been rotated by the motor 124 such that the projection 178 of the crank 126 actuates the second switch sensor 172, indicating to the control unit 160 that the supporting racks 102, 103 are in a toasting position. Finally, at Position 3, the crank 126 has been rotated by the motor 124 such that the projection 178 of the crank 126 actuates the second switch sensor 174, indicating to the control unit 160 that the heating elements 18 can be energized to commence toasting.

Figure 10:
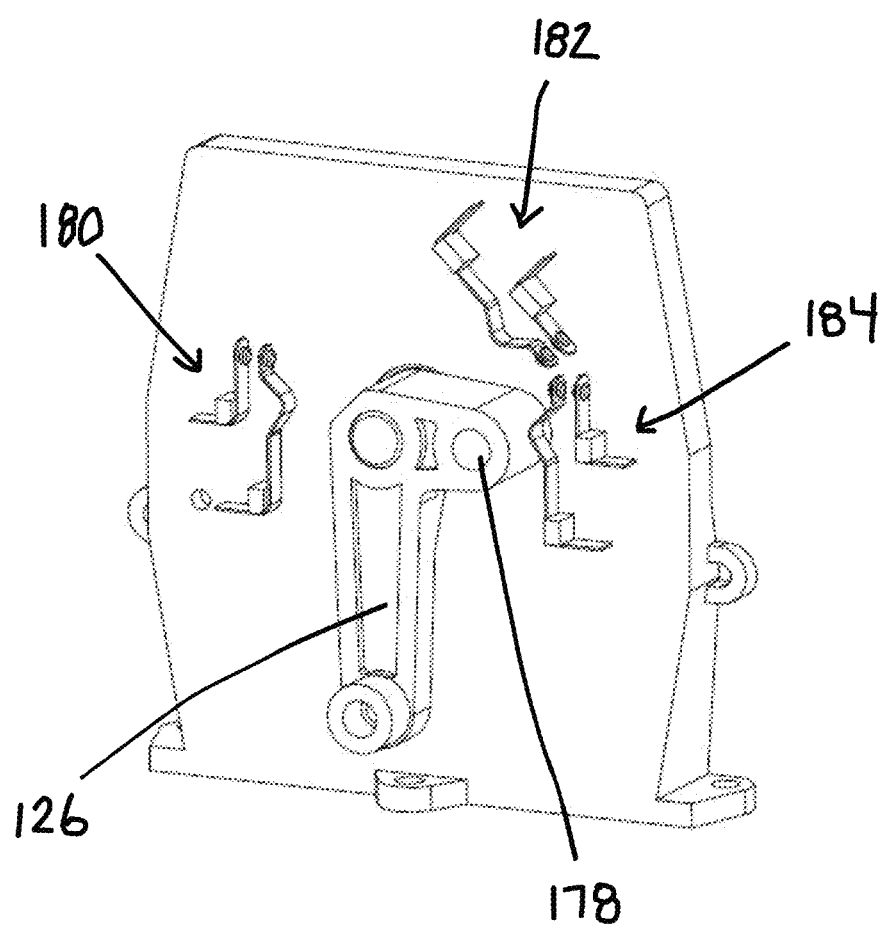
FIG. 10 is a perspective view of a carriage positioning system according to another embodiment of the invention.

With reference to FIG. 10, in an embodiment, the positioning system may alternatively include a plurality of leaf spring switches (e.g., switches 180, 182, 184) and the crank 126 may likewise have a projection 178 that is configured to actuate each leaf spring switch as the crank 126 rotates under control of the motor 124. The control unit 160 is able to determine the position of the slider assemblies and supporting racks based upon which leaf spring switch has been actuated. Namely, the leaf spring switches provide a position signal to the control unit 160 indicative of the orientation of the crank 160 (and thus the slider assemblies and supporting racks). While three leaf spring switches are illustrated, it is contemplated that more or fewer than three leaf spring switches may be utilized to provide a greater (or lower) level of control over the positioning of the carriage assembly.

Figure 11:
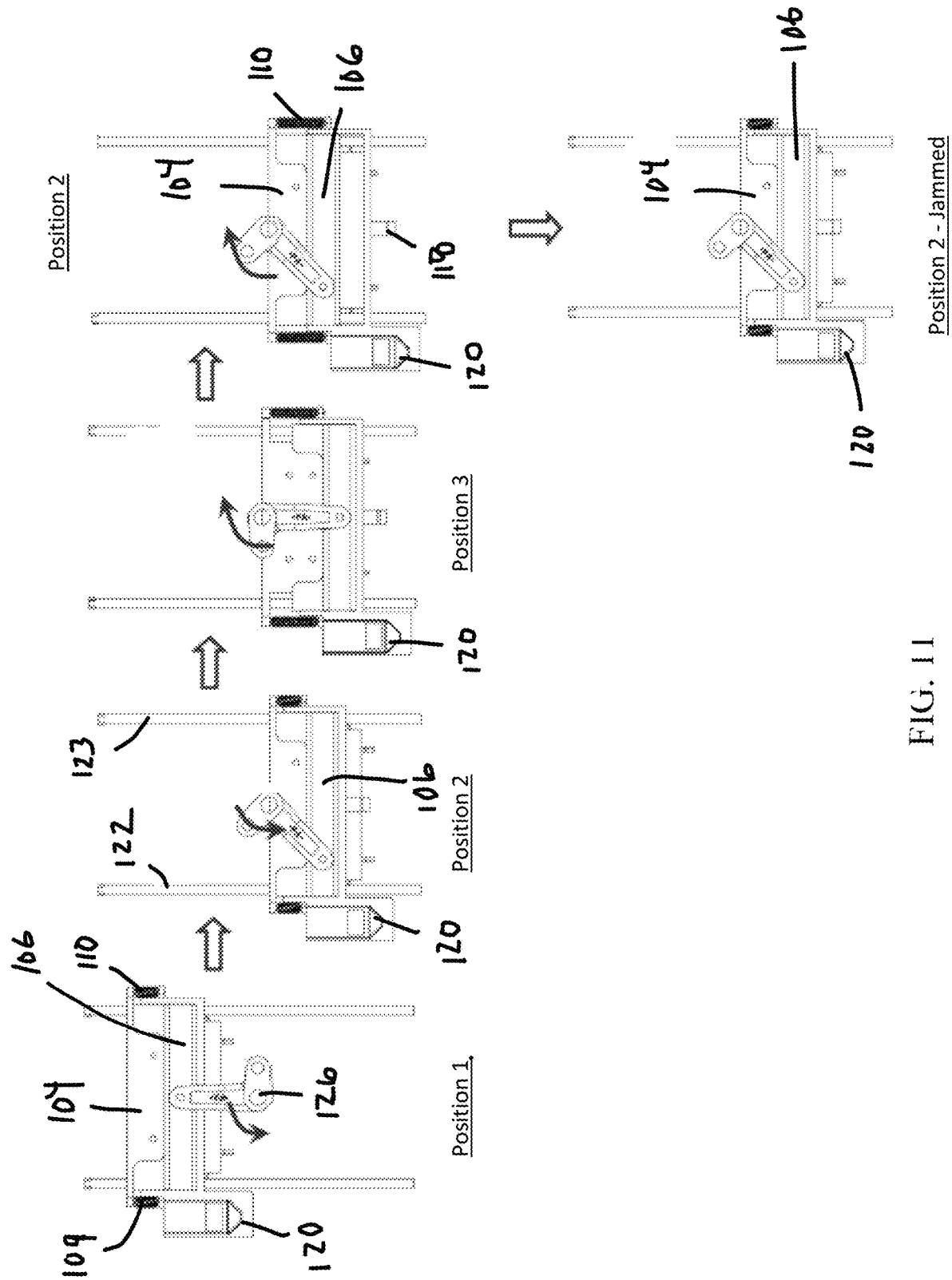
FIG. 11 are front elevational views of the carriage assembly illustrating operation thereof.
Figure 12:
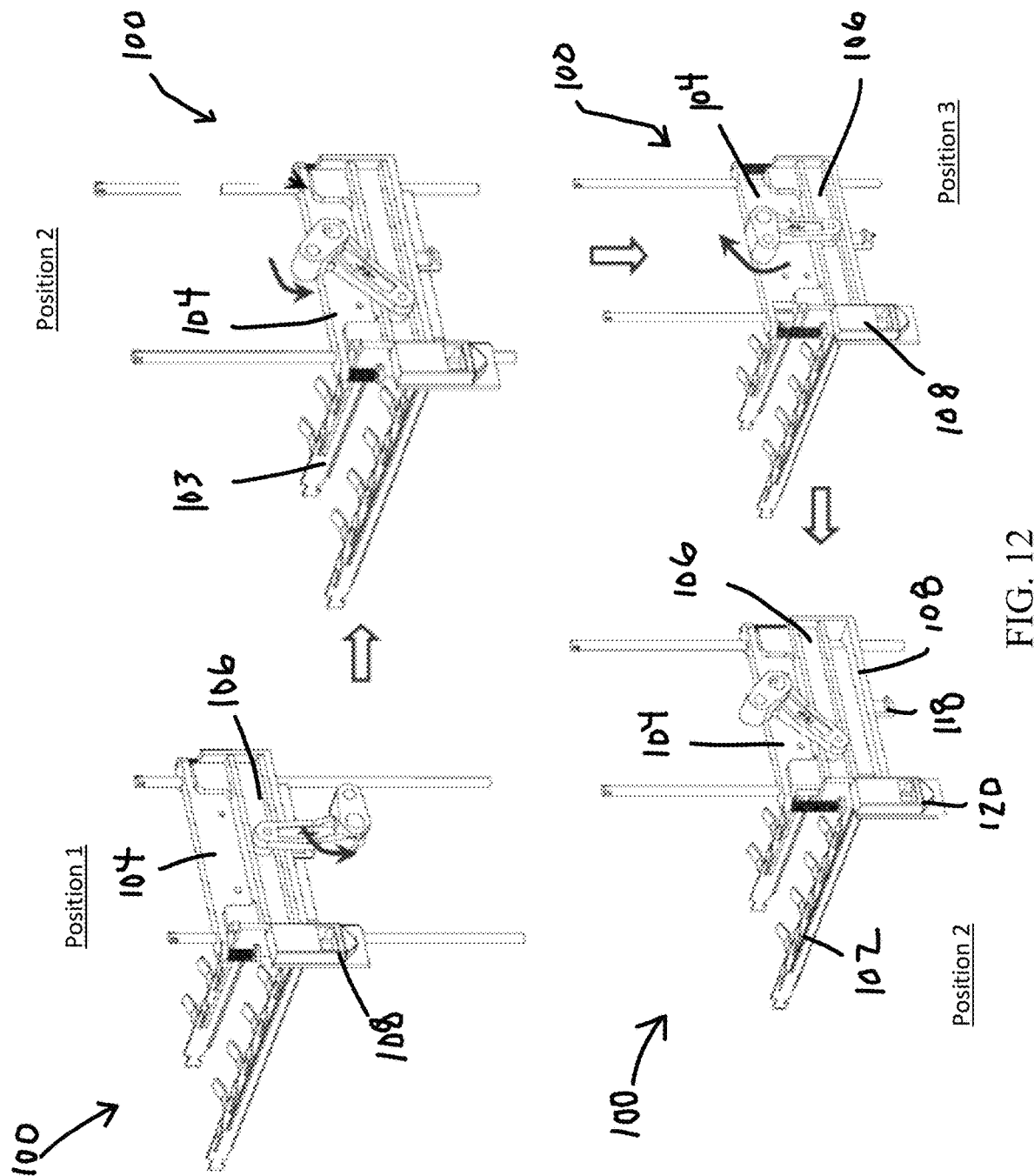
FIG. 12 are perspective views of the carriage assembly illustrating operation thereof.
Figure 13:
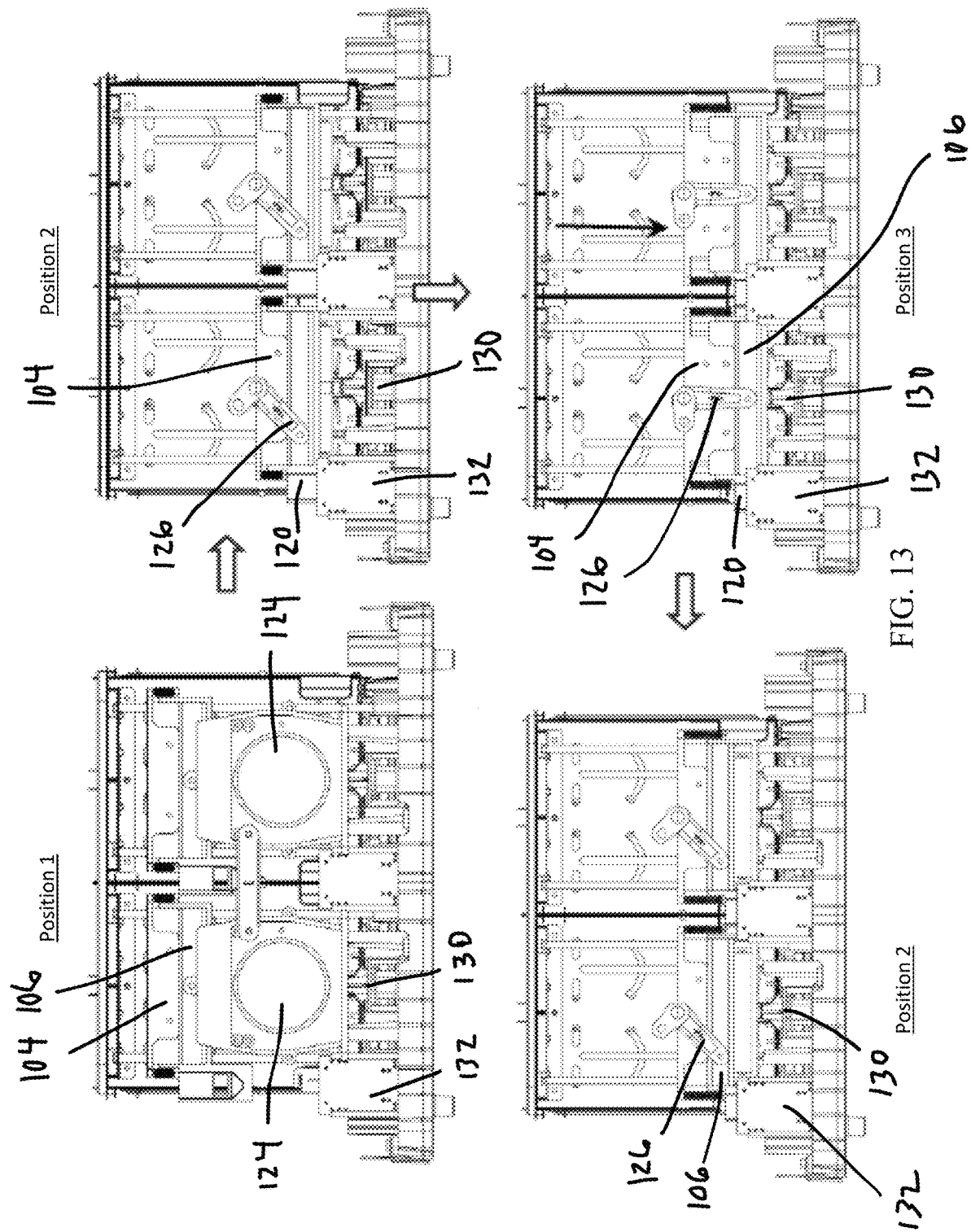
FIG. 13 are front elevational views of the toaster of FIG. 1, illustrating operation of the carriage assembly.

Turning now to FIGS. 11-13, operation of the carriage assembly 100 during a toasting operation is illustrated. Position 1 in FIG. 11 shows the position of the slider members 104, 106 108 before commencing a toasting operation. A shown therein, upon actuating the toast button/switch 156, the rotational output of the motor 124 drives the second slider member 106 downward along the guide rods 122, 123 via engagement of the distal end of the crank 126 in the slot 114 of the second slider member 106. As the second slider member 106 moves downwardly, it contacts the upwardly-facing contacting surface 116 of the third slider member 108, thereby urging the third slider member 108 downward as well. Due to the connection of the third slider member 108 with the first slider member 104 via the extension springs 109, 110, this downward movement of the third slider member 108 thus causes a corresponding downward movement of the first slider member 104 and connected supporting racks 102, 103 along guide rods 122, 123.

As shown in FIG. 11, the first slider member 104 and the supporting rack 102 stop the bottom of the chassis in a position in which the slice of bread carried by the supporting rack 102 is received fully in the slot 14 for toasting. This position is shown as Position 2 in FIGS. 11-13. The second and third slider members 106, 108 keep moving downwardly as the motor 124 continues to drive the crank 126, against the bias of the extension springs 109, 110 (which are loaded as the third slider member 108 keeps moving downwardly under urging from the second slider member 106 as the first slider member 104 remains stationary). As the third slider member 108 moves downwardly along the guide rods 122, 123 the actuator finger 120 of the third slider member 108 contacts the leaf spring switch 132 at the bottom-most position of the second slider member 106 and third slider member 108. In response to actuation of the leaf spring switch 132 by the finger 120, the control unit 160 energizes the electromagnet 130 to engage the hook lock 118 of the third slider member 108 to retain the third slider member 108 in its lowermost position, as illustrated by Position 3 in FIGS. 11-13.

The motor 124 continues to drive the second slider member 106 via engagement of the end of the crank 126 in the slot 114 of the second slider member 106. In particular, the motor 124 drives the second slider member 106 to move upwardly along the guide rod 122 (back to Position 2) while the third slider member 108 is retained in its bottom position via engagement of the hook lock 118 by the electromagnet 130 to continue the toasting operation. At this point (i.e., once the leaf spring switch 132 and electromagnet 130 are actuated, and the second slider member 106 is returned to Position 2), the control unit 160 activates the heating elements 18 to toast the food item within the slot 14.

At the end of the toasting operation, the electromagnet 130 is disengaged under control of the control unit 160 and the motor 124 drives supporting racks 102, 103 upwardly along the guide rods 109, 110. In particular, as the motor 130 urges the second slider member 106 upwardly via engagement of the distal end of the crank 126 in the slot 114 of the second slider member 106, the linkage arms 112, 115 of the second slider member 106 moves upwardly within the windows 111, 113 of the first slider member 104 until it contacts the first slider member 104, urging it (and the connected supporting racks 102, 103) upward to Position 1. The third slider member 108 follows via the interconnection between the first slider member 104 and the third slider member 108 via extension springs 109, 110. Importantly, as the third slider member is moved upwardly, the finger 120 disengages from the leaf spring power switch 132, which causes the control unit 160 to deactivate the heating elements 18, ending the toasting operation.

In the event that the first slider member 104 or third slider member 108 are jammed, the electromagnet 130, being turned off, would release the hook lock 118 of the third slider member 108 as indicated above. Once the electromagnet 130 disengages the third slider member 108, the extension springs pull up on the third slider member 108 even in the event of a jam. This upward force generated by the extension springs 109, 110 causes the finger 120 to disengage from the leaf spring power switch 132, causing the control unit 160 to deactivate the heating elements 18. In an embodiment, it is contemplated that the heating elements 18 may be directly controlled via activation/deactivation of the leaf spring power switch 132 rather than being controlled via the control unit 160. As indicated above, the auxiliary relay 166 can cut off power to all heating element 18 in the event of mechanism failure.

Figure 14:
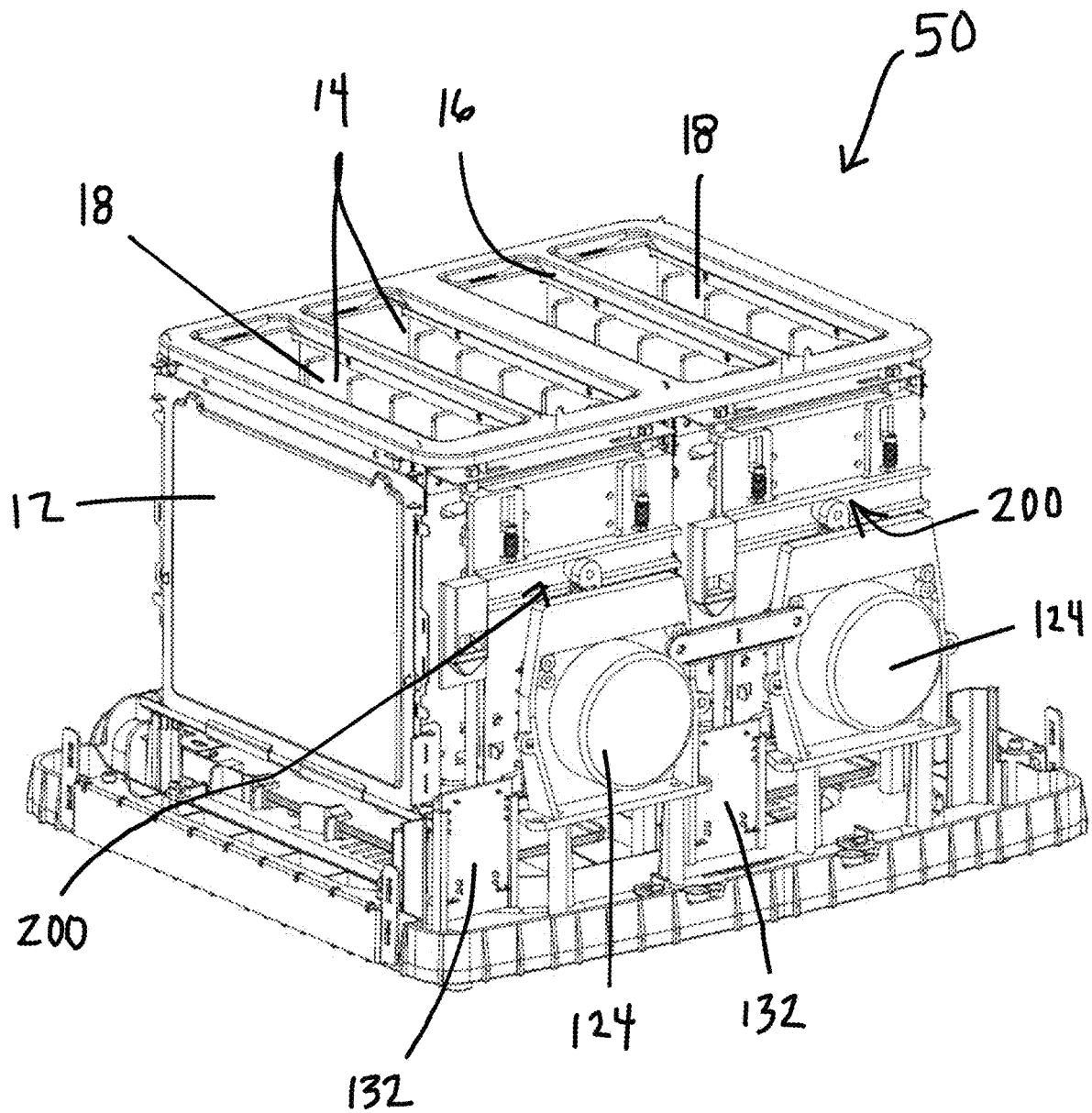
FIG. 14 is a front, perspective view of a toaster according to another embodiment of the present invention.

Turning now to FIGS. 14, a toaster 50 according to another embodiment of the present invention is illustrated. The toaster 50 is similar to toaster 10, where like reference numerals designate like parts. The toaster also includes a carriage assembly 200 similar to carriage assembly 100. With reference to FIGS. 16-19, the carriage assembly 200 includes a pair of supporting racks 102, 103 for supporting two separate slices of bread or other food items. In particular, each supporting rack 102, 103 may be positioned in a respective slot 14 in the housing and fixedly connected to a single first sliding member 202. As illustrated, the carriage assembly 200 includes a first slider member 202 and a second slider member 204 operatively connected to one another in the manner hereinafter described. The supporting racks 102, 103 are fixedly connected to the first slider member 202 and moveable therewith. The first slider member 202 is connected to second member 204 via a pair of extension springs 109, 110.

Figure 19:
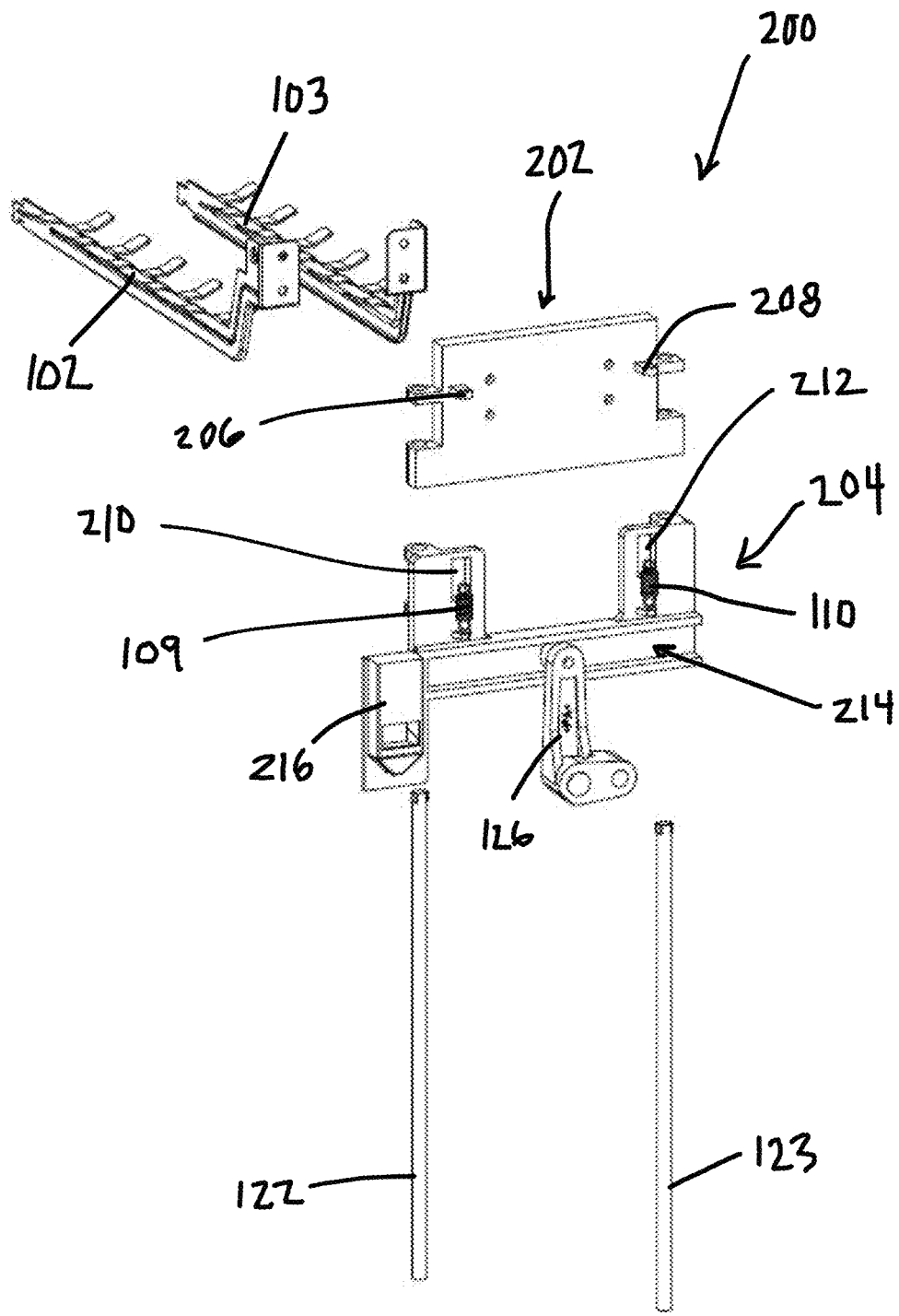
FIG. 19 is an exploded, perspective view of the carriage assembly of FIG. 16.

As best shown in FIG. 19, the first slider member 202 includes a pair of projections or tabs 206, 208 that are received in corresponding window openings 210, 212 in the second slider member 204. In an embodiment, the components may be reversed such that the second slider member 204 has the projections and the first slider member 202 has the window openings that receive the projections. The second slider member 204 also includes a horizontally-oriented slot 214 and a switch actuator in the form of a finger 216 laterally positioned with respect to the slot 214. The first slider member 202 and second slider member 204 are each slidably connected to a pair of vertically-oriented guide rods 122, 123 which may be considered to form part of the carriage assembly 200 such that each of the first slider member 202 and second slider member 204 are vertically moveable along the guide rods 122, 123. As will be appreciated, the carriage assembly 200 is generally similar to carriage assembly 100, however, the component parts have been simplified so that two slider members are utilized instead of three. In particular, the finger 216 for actuating the leaf spring power switch 132 has now been integrated into the second slider member 204 (and the third slider member omitted). In addition, the electromagnet for engaging a hook lock has also been omitted.

Figure 20:
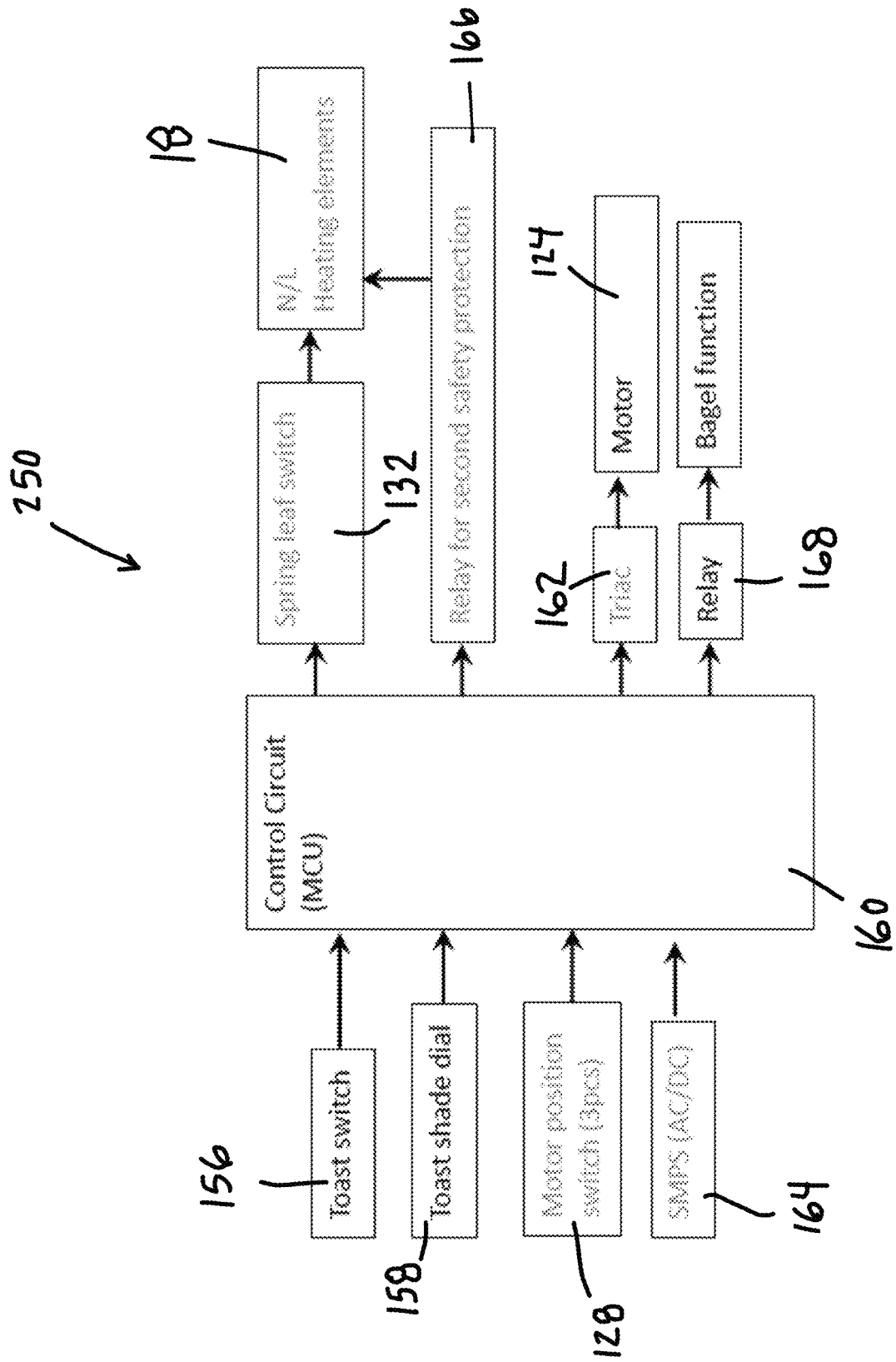
FIG. 20 is a schematic illustration of a control system and control logic of the toaster of FIG. 14.

With reference to FIG. 20, the control system 250 for a toaster 10 having the carriage assembly 200 is substantially similar to control system 150 of FIG. 6, where like reference numerals designate like parts. Rather than having a leaf spring switch and electromagnet, however, the control system uses only a leaf spring switch 132 (actuated by the actuator finger 216 of the second slider member 204 to control the heating element 18.

Figure 21:
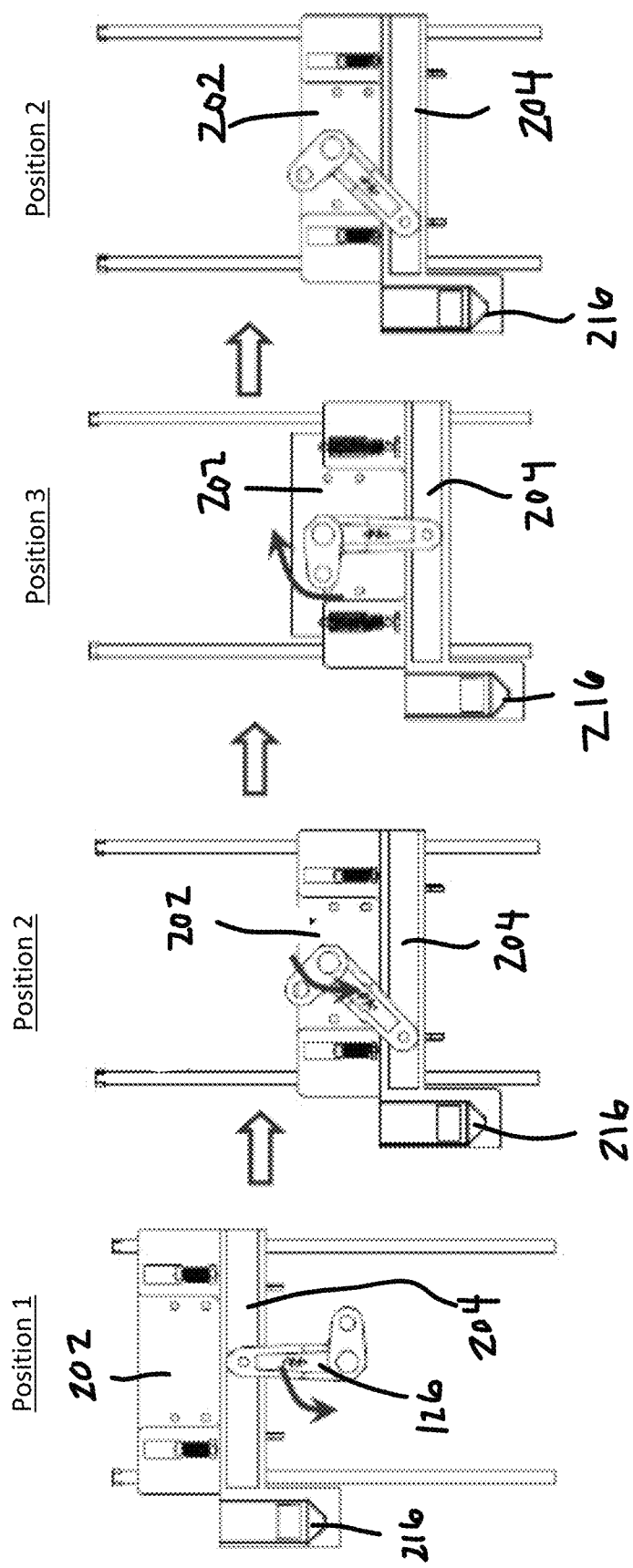
FIG. 21 are front elevational views of the carriage assembly illustrating operation thereof.
Figure 22:
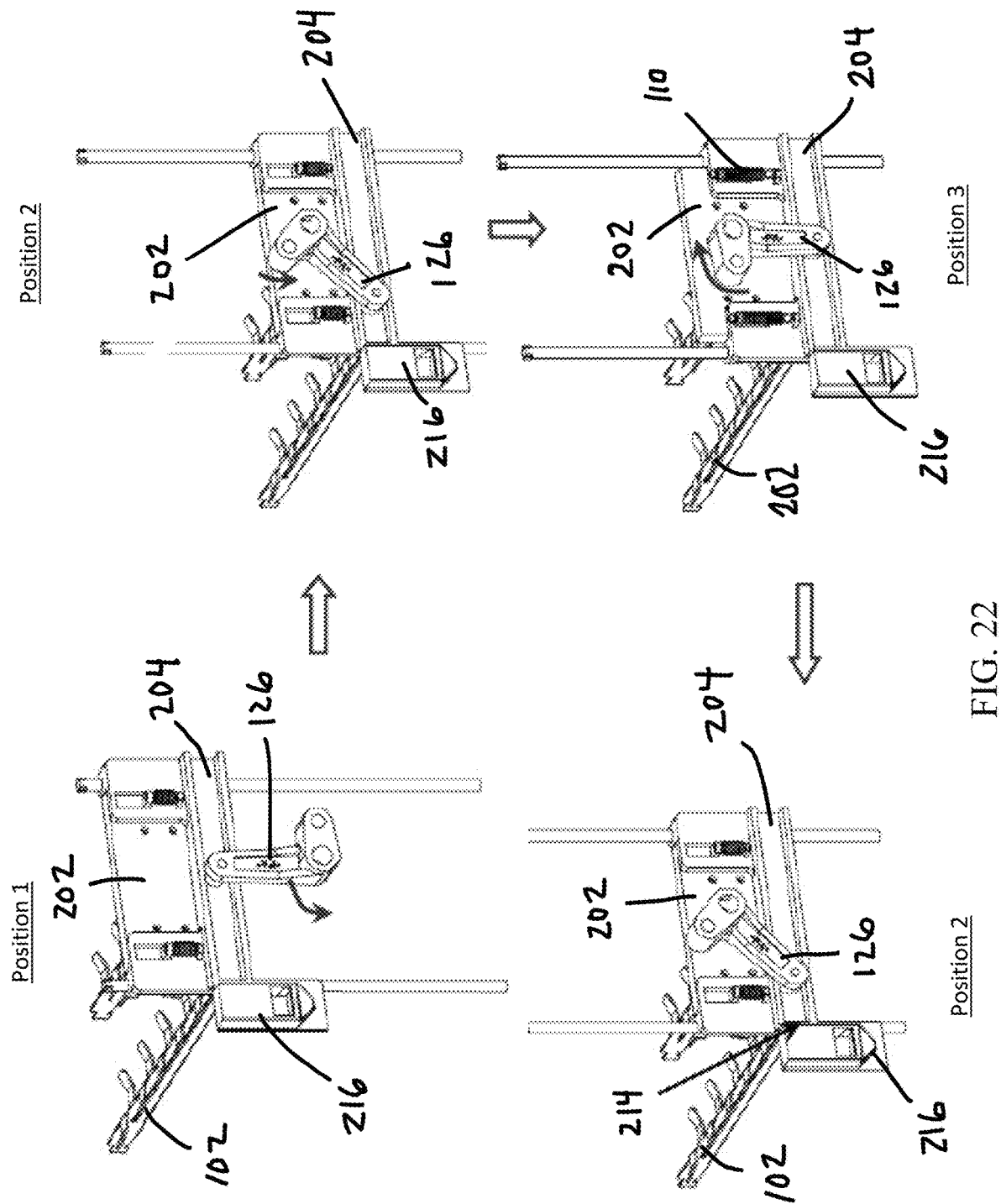
FIG. 22 are perspective views of the carriage assembly illustrating operation thereof.

Operation of the carriage assembly 200 will now be described with reference to FIGS. 21 and 22. Upon pressing the toast button/switch 156, the motor 124 drives the second slider member 204 down from Position 1 to Position 2 via the crank 126 received in the slot 214 of the second slider member 204. The second slider member 204 then pulls the first slider member 202 downward via the extension springs 109,110 which interconnects the first slider member 202 and the second slider member 204. Similar to the embodiments described above, the first slider member 202 and supporting racks 102, 103 stop at Position 2, which is the bottom of the chassis and the proper position for toasting. The second slider member 204 keeps moving downwardly to Position 3 until the finger 216 of the second slider member 204 actuates the leaf spring power switch 132. Upon actuation of the leaf spring power switch 132 by the finger actuator 216, the control unit 160 controls the motor 124 to stop and actuates the heating elements 18 to commence toasting. After toasting, the control unit 160 once again actuates the motor 124, which drives the first slider member 202 and the second slider member 204 upward to Position 1 (via engagement of the tabs 206, 208 in the window openings 210, 212).

Similar to the embodiments described above, in the event of a jam, the motor rotates and pulls the second slider member 204 up to Position 2 to disengage the finger 216 from the leaf spring switch 132 to turn off the leaf spring switch 132 and heating elements 18. In addition, as noted above, the control system 250 includes a relay 166 for redundant safety protection, which cuts off all the heating elements in the case of mechanism or motor failure.

The various embodiments of the present invention described herein therefore provide for a motorized toaster having a control and positioning system that provides for the precise control over food item positioning and toasting, as well as allowing for various food items, regardless of size, to be automatically positioned for ease of removal after a toasting operation. In addition, the toaster and carriage assemblies of the present invention obviate the need to use relays for motor and heater control. Moreover, the toaster of the present invention provides an anti-jam function in the case a food item is jammed in the toaster slot, which automatically cuts power to the heating elements in the event of a jam.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A toaster, comprising:
   a housing having a slot for receiving a food item;
   a heating element associated with the slot for toasting the food item;
   a carriage assembly having a supporting rack movably mounted in the slot for supporting the food item within the slot, a first slider member connected to the supporting rack, and a second slider member operatively connected to the first slider member;
   a motor;
   a driving member having a first end operatively connected to the motor and a second end received in a slot in the second slider member such that when the motor is driven to rotate the driving member, the driving member drives the supporting rack, via the first slider member and the second slider member, to slidably move within the slot;
   a pair of guide rods including a first guide rod and a second guide rod vertically positioned within the housing;
   wherein the first slider member and the second slider member are slidably connected to the first guide rod and the second guide rod;

wherein the carriage assembly further includes a third slider member slidably connected to the first guide rod and the second guide rod;

wherein the second slider member is positioned intermediate the first slider member and the third slider member; and wherein the second slider member and the third slider member are configured such that downward movement of the second slider member imparts a corresponding downward movement of the third slider member.

2. The toaster of claim 1, wherein:

the third slider member includes an actuator member;

wherein the toaster further includes a switch controlling power to the heating element;

wherein the actuator member and the switch are positioned and configured such that when the third slider member is driven downwardly by the second slider member, the actuator member actuates the switch to activate the heating element to initiate a toasting operation.

3. The toaster of claim 2, wherein:

the switch is a leaf spring power switch.

4. The toaster of claim 3, wherein:

the third slider member includes a first engagement member; and wherein the toaster further includes an electromagnet;

wherein the electromagnet is configured to engage the first engagement member of the third slider member to retain the third engagement member in a toasting position during the toasting operation.

5. The toaster of claim 4, wherein:

the third slider member is connected to the first slider member through a plurality of extension springs;

wherein the extension springs are placed in a loaded state when the third slider member is moved to the toasting position; and wherein the extension springs are configured to move the third slider member upward when the first engagement member is disengaged form the electromagnet to deactivate the switch to terminate the toasting operation.

6. A method for toasting a food item, comprising the steps of:

providing a toaster having a housing having a slot for receiving a food item, a heating element associated with the slot for toasting the food item, and a carriage assembly having a supporting rack movably mounted in the slot for supporting the food item within the slot;

with a control unit, and in response to initiation of a toasting operation, moving the supporting rack to a lowered position within the slot by actuating a motor to rotate a driving member, whereby rotation of the driving member drives the supporting rack, via a first slider member and a second slider member, to slidably move within the slot;

actuating the motor to cause the driving member to downwardly move the supporting rack, first slider member and second slider member from a first position to as second position; and maintaining the supporting rack and the first slider member at the second position while moving the second slider member downwardly to a third position.

7. The method according to claim 6, wherein:

the second slider member includes an actuator member;

wherein the toaster further includes a switch controlling power to the heating element;

wherein the actuator member and the switch are positioned and configured such that when the second slider member is driven downwardly by the driving member, the actuator member actuates the switch to activate the heating element to initiate a toasting operation.

8. The method according to claim 6, wherein:

in the third position, the actuator member actuates the switch to activate the heating element to initiate the toasting operation.

9. The method according to claim 8, further comprising the step of:

after a predetermined time period, driving the second slider member to the second position to disengage the actuator member from the switch to deactivate the heating element.

10. The method according to claim 8, wherein:

in the third position, extensions springs interconnecting the first slider member and the second slider member are in a loaded position.

11. A toaster, comprising:

a housing having a plurality of slots for receiving food items to be toasted;

a heating element associated with each slot of the plurality of slots for toasting the food items;

a carriage assembly having a plurality of supporting racks, each supporting rack being movably mounted in a respective slot of the plurality of slots, for supporting the food items within the slots, a first slider member connected to the supporting racks, a second slider member operatively connected to the first slider member, and a third slider member operatively connected to the first slider member;

a motor; and a driving member having a first end operatively connected to the motor and a second end received in a slot in the second slider member such that when the motor is driven to rotate the driving member, the driving member drives the supporting racks, via the first slider member, the second slider member and the third slider member, to slidably move within the slots;

wherein the third slider member includes an actuator member;

wherein the toaster further includes a switch controlling power to the heating elements; and wherein the actuator member and the switch are positioned and configured such that when the third slider member is driven downwardly by the second slider member, the actuator member actuates the switch to activate the heating elements to initiate a toasting operation.

* * * * *